(12) United States Patent
Yuan et al.

(10) Patent No.: US 8,873,510 B2
(45) Date of Patent: Oct. 28, 2014

(54) GATEWAY SELECTION METHOD, APPARATUS AND SYSTEM DURING HETEROGENEOUS NETWORK HANDOVER

(75) Inventors: Liping Yuan, Shanghai (CN); Leibin Zheng, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 11 days.

(21) Appl. No.: 13/572,455

(22) Filed: Aug. 10, 2012

(65) Prior Publication Data

US 2012/0307797 A1 Dec. 6, 2012

Related U.S. Application Data

(63) Continuation of application No. PCT/CN2010/070676, filed on Feb. 12, 2010.

(51) Int. Cl.
*H04W 36/00* (2009.01)

(52) U.S. Cl.
USPC .......................................................... 370/331

(58) Field of Classification Search
CPC .................................................... H04W 36/00
USPC .......................................................... 370/331
See application file for complete search history.

(56) References Cited

U.S. PATENT DOCUMENTS

| | | |
|---|---|---|
| 2002/0136226 A1 | 9/2002 | Christoffel et al. |
| 2004/0264476 A1* | 12/2004 | Alarcon et al. .......... 370/395.52 |
| 2008/0081625 A1 | 4/2008 | Ergen et al. |
| 2008/0095119 A1* | 4/2008 | Bachmann et al. ........... 370/332 |
| 2009/0201883 A1 | 8/2009 | Yan et al. |
| 2010/0246532 A1* | 9/2010 | Olvera-Hernandez et al. ............................ 370/331 |
| 2012/0129534 A1 | 5/2012 | Bachmann et al. |

FOREIGN PATENT DOCUMENTS

| | | |
|---|---|---|
| CN | 1984436 A | 6/2007 |
| CN | 101036356 A | 9/2007 |
| CN | 101128022 A | 2/2008 |
| CN | 101170808 A | 4/2008 |
| CN | 101345998 A | 1/2009 |
| CN | 101662756 A | 3/2010 |
| EP | 2169849 A1 | 3/2010 |

OTHER PUBLICATIONS

Written Opinion of the International Searching Authority issued in corresponding PCT Patent Application No. PCT/CN2010/070676, mailed Nov. 11, 2010.
International Search Report issued in corresponding PCT Patent Application No. PCT/CN2010/070676, mailed Nov. 11, 2010.
3$^{rd}$ Generation Partnership Project, "Technical Specification Group Services and System Aspects; Architecture Enhancements for non-3GPP Accesses" (Release 8) 3GPP TS 23.402, V8.2.0, Jun. 2008.

* cited by examiner

*Primary Examiner* — Sulaiman Nooristany
(74) *Attorney, Agent, or Firm* — Brinks Gilson & Lione (57) ABSTRACT

Embodiments of the present invention disclose a gateway selection method for heterogeneous networks, where the method includes: accessing, by a terminal, an access network 1; obtaining, by the terminal, an equipment identity of a core network element 1; accessing, by the terminal, an access network 2, where the access network 2 and the access network 1 are heterogeneous networks; and sending, by the terminal, the obtained equipment identity of the core network element 1 to a core network element 2, and if an equipment identity of the core network element 2 is different from the equipment identity of the core network element 1, selecting the core network element 1 as a target gateway. Accordingly, the embodiments of the present invention further provide a terminal, a core network element, and a communication system.

11 Claims, 10 Drawing Sheets

GATEWAY SELECTION METHOD, APPARATUS AND SYSTEM DURING HETEROGENEOUS NETWORK HANDOVER

CROSS-REFERENCE TO RELATED APPLICATIONS

This application is a continuation of International Application No. PCT/CN2010/070676, filed on Feb. 12, 2010, which is hereby incorporated by reference in its entirety.

FIELD OF THE INVENTION

The present invention relates to the field of communications technologies, and in particular, to a gateway selection method and apparatus during heterogeneous network handover.

BACKGROUND OF THE INVENTION

Figure 1:
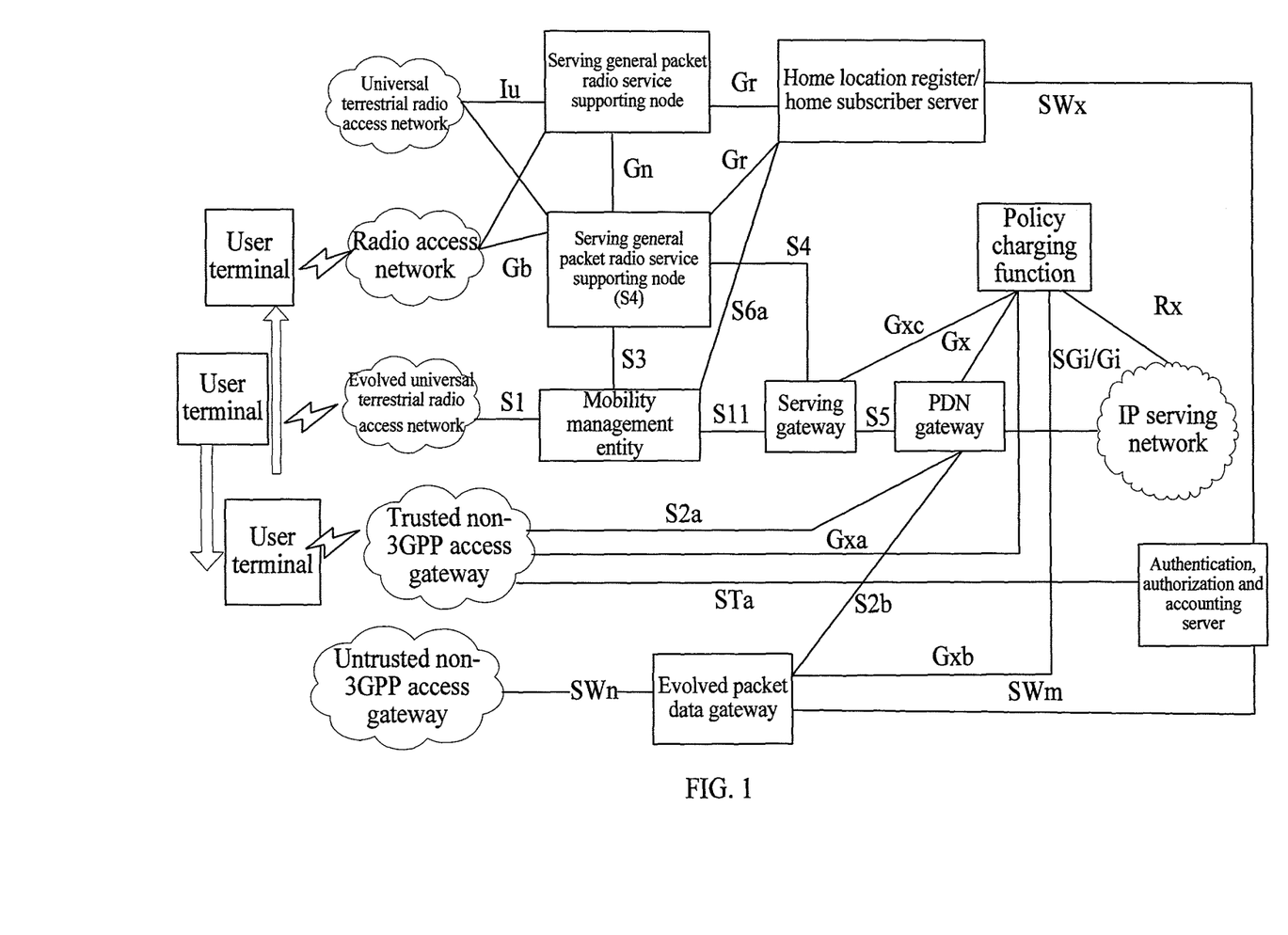
FIG. 1 is an architecture diagram of a communication network in the prior art.

The 3GPP (Third Generation Partnership Project, third generation partnership project), as an innovation trend and a target of a next generation digital communication technology, is one of the hot topics that attract the most attention in today's world. A network structure of the 3GPP basically includes a circuit switched domain and a packet switched domain, and the network structure adopts a structure that is similar to that of a second generation mobile communication system, and includes a universal terrestrial radio access network (UTRAN, Universal Terrestrial Radio Access Network), a GSM/EDGE radio access network (GERAN, GSM/EDGE Radio Access Network), a core network (CN, Core Network), and a user terminal (UE, User Equipment). The GERAN/UTRAN are used to implement all radio-related functions, and the CN processes all voice calls and data connections in a general packet radio service/universal mobile telecommunication service (GPRS/UMTS) system, and is also used to implement functions of switching and routing with an external network. The PS domain includes nodes such as a serving general packet radio service supporting node (SGSN, Serving GPRS Supporting Node), and a gateway general packet radio service supporting node (GGSN, Gateway GPRS Supporting Node). As shown in FIG. 1, the GGSN is mainly responsible for interfacing with an external network, and meanwhile, the GGSN is also responsible for implementing transmission of user plane data. The SGSN implements functions of routing forwarding, mobility management, session management, and user information storage. A home location register (HLR, Home Location Register) is used to store user subscription information.

Long term evolution (LTE, long term evolution)/system architecture evolution (SAE, System architecture evolution) is a next generation mobile network developed by the 3GPP, where the LTE is formed by an evolved universal terrestrial radio access network (E-UTRAN, evolved-UTRAN), and includes an eNodeB network element; the SAE is formed by an MME, a serving gateway (SGW, Serving Gateway), a PDN gateway (PGW, PDN Gateway), and a home subscriber server (HSS, Home Subscriber Server); the eNodeB implements radio-related functions; a mobility management entity (MME, Mobility Management Entity) is a control network element of a packet switched domain, and implements mobility-related functions of certification, mobility management, and session management; and the SGW and the PGW are both gateways, but due to different positions in the network, the SGW and the PGW have different functions, and basic functions are to implement session management, data forwarding, and charging information collection. Because the SGW is connected with the eNodeB, the SGW also has the function of local convergence eNodeB connection.

When a non-3GPP network and a 3GPP network coexist, they may be connected through a PGW. A non-3GPP gateway, for example, an enhanced packet data gateway ePDG or a trusted non-3GPP gateway, accesses the PGW through an S2a or S2b interface, and when the S2a and the S2b support a MIP protocol, the non-3GPP gateway serves as a client of a PMIP, and the PGW serves as a server of the PMIP. When the non-3GPP is handed over to the 3GPP in a PMIP manner, in order to maintain session continuity, when the UE registers in the non-3GPP, a used PGW is registered in the HSS, and when the UE is handed over to the 3GPP, the UE indicates to the network that this is a handover, and the network element MME of the core network obtains the registered PGW from the HSS, and then requests to route to the PGW registered by the non-3GPP, thus completing anchoring of the PGW and maintaining the session continuity. This implementation manner is complex, and multiple network elements including the HSS are involved. A solution for handing over from the 3GPP to the non-3GPP is similar.

When the 3GPP is handed over to the non-3GPP in a DSMIP manner, in order to maintain session continuity, the UE obtains IP address information of the PGW at the 3GPP, and then is handed over to the non-3GPP. First, an IP address of a Home Agent of a current service area is obtained from a broadcast message, and then is compared with a stored IP address. If the IP address of the Home Agent of the current service area is the same as the stored IP address, the PGW is directly contacted according to the address; and if the IP address of the Home Agent of the current service area is different from the stored IP address, an HA of the current service area is selected, but in this case, the session continuity may not be maintained. In this scenario, the terminal needs to support a MIP protocol stack, and the UE directly obtains an address of a packet switched gateway, which easily brings risks to network security.

SUMMARY OF THE INVENTION

In view of the disadvantages mentioned in the prior art, embodiments of the present invention provide a gateway selection method during heterogeneous network handover.

An embodiment of the present invention provides a method for heterogeneous network handover, where the method includes:

accessing, by a terminal, an access network 1;

obtaining, by the terminal, an equipment identity of a core network element 1;

accessing, by the terminal, an access network 2, where the access network 2 and the access network 1 are heterogeneous networks;

sending, by the terminal, the obtained equipment identity of the core network element 1 to a core network element 2, and if an equipment identity of the core network element 2 is different from the equipment identity of the core network element 1, selecting the core network element 1 as a target gateway.

Accordingly, an embodiment of the present invention provides a terminal, where the terminal includes:

a network access unit, configured to access an access network 1 and an access network 2 in sequence, where the access network 1 and the access network 2 are heterogeneous networks;

an equipment identity obtaining unit, configured to obtain an equipment identity of an core network element 1; and an equipment identity sending unit, configured to send the equipment identity which is of the core network element 1 and obtained by the equipment identity obtaining unit, to the core network element 2.

An embodiment of the present invention further provides a core network element, where the core network element includes:

an equipment identity receiving unit, configured to receive an identity which is of another core network element and sent by a terminal; and a target gateway selecting unit, configured to, according to the identity which is of the core network element and received by the equipment identity receiving unit, select a target gateway; and if the received equipment identity is different from the equipment identity of the core network element its elf, select a core network element corresponding to the received equipment identity as a target gateway.

Meanwhile, an embodiment of the present invention further provides a communication system, where the communication system includes an access network 1, an access network 2 that is heterogeneous to the access network 1, and a core network element 1 that belongs to a same network as a core network 1, and further includes:

a terminal, configured to access the access network 1, obtain an equipment identity of the core network element 1; and access the access network 2, and send the obtained equipment identity of the core network element 1 to a core network element 2; and a core network element, configured to receive the equipment identity which is of the core network element 1 and sent by the terminal, according to the received identity of the core network element, select a target gateway; and if an equipment identity of the core network element 2 is different from the equipment identity of the core network element 1, select the core network element 1 as a target gateway.

The implementation of the method provided by the embodiments of the present invention is simple, and a PGW does not need to be registered in an HSS, thus reducing network elements that participate in the handover; moreover, the terminal does not need to support a complex MIP protocol stack, thus improving network security.

DETAILED DESCRIPTION OF THE EMBODIMENTS

The technical solutions according to the embodiments of the present invention are clearly and completely described in the following with reference to the accompanying drawings. Obviously, the embodiments to be described are only part of rather than all of the embodiments of the present invention. All other embodiments obtained by persons of ordinary skill in the art based on the embodiments of the present invention without creative effects shall fall within the protection scope of the present invention.

Figure 2:
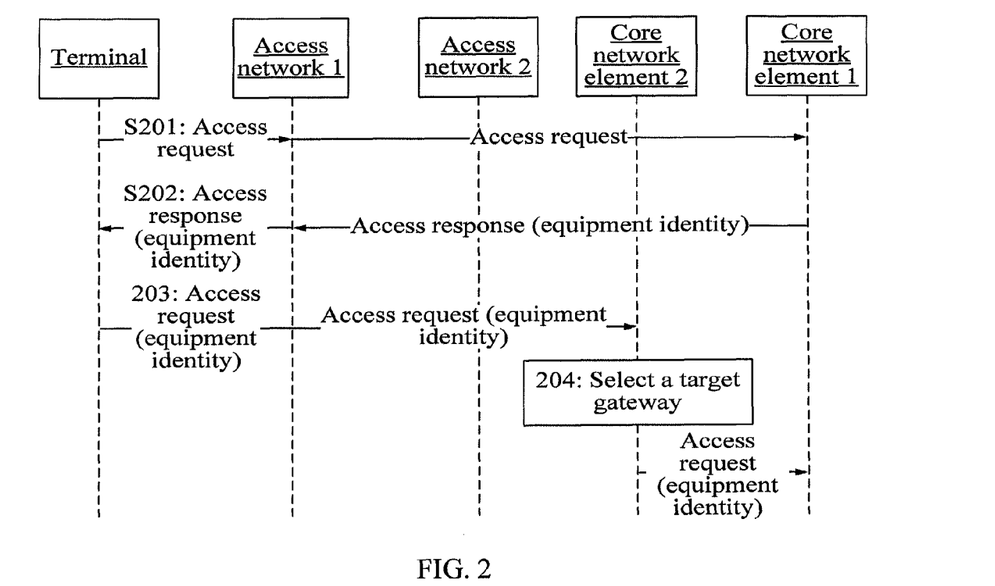
FIG. 2 is a schematic flowchart of a method according to a first embodiment of the present invention.

A first embodiment of the present invention provides a gateway selection method during heterogeneous network handover, which may maintain call continuity, so that a terminal accesses heterogeneous networks in sequence, and maintains to select a same core network element. Referring to FIG. 2, the method specifically includes:

S201: A terminal accesses an access network 1.

The access network 1 may be a 3GPP access network, such as a UMTS radio access network, an LTE/SAE access network, and may also be a non-3GPP access network, such as a WiFi access network; specifically, the terminal may send an access request to the access network 1.

S202: The terminal obtains an equipment identity of a core network element 1.

If the access network 1 is a UMTS, the core network element 1 may be a GGSN; and if the access network 1 is an LTE/SAE, the core network element 1 may be a PGW.

Specifically, the equipment identity of the core network element 1 may be obtained through a protocol optional configuration information element or an APN in which an identity of a PGW or an identity of a GGSN is carried, for example, through an protocol optional configuration information element or an APN in an activate PDP context accept message, or through an optional configuration information element in an attach complete message, or through an protocol optional configuration information element or an APN in a default bearer creation request in an attach accept message. For details, reference may be made to the following embodiment.

S203: The terminal accesses an access network 2 that is heterogeneous to the access network 1.

If the access network 1 is a 3GPP access network, the access network 2 is a non-3GPP access network; similarly, if the access network 1 is a non-3GPP access network, the access network 2 is a 3GPP access network.

S204: The terminal sends the obtained equipment identity of the core network element 1 to a core network element 2, and if an equipment identity of the core network element 2 is different from the equipment identity of the core network element 1, selects the core network element 1 as a target gateway.

The terminal sends the equipment identity which is of the core network element 1 and obtained in S202 to the core network element 2.

The core network element 2 may be a gateway device, and may also be a non-gateway device. The equipment identity of the core network element 2 is different from the equipment identity of the core network element 1 in S204. The core network element 1 and the core network element 2 may both be gateway devices, for example, both are PGWs; or the core network element 1 may be a gateway device, and the core network element 2 may be a non-gateway device such as an SGW or a non-3GPP access network gateway, so that the equipment identities are certainly different.

According to the equipment identity which is of the core network element 1 and obtained by the terminal, if the equipment identity of the core network element 1 is the equipment identity of the core network element 2, that is, the core network element 2 is a target gateway, the core network element 2 completes access and uses a same terminal address, that is, continuity of a session is maintained. If the equipment identity of the core network element 1 is different from that of the core network element 2, according to local configuration or DNS domain name resolution, the core network element 2 obtains an address of the core network element 1, and selects the core network element 1 as a target gateway, and sends an access request to the target gateway. If the core network element 2 is a non-gateway device, the core network element 2 directly obtains the equipment identity of the core network element 1 through local configuration or DNS domain name resolution, obtains an address of the core network element 1, and further selects the core network element 1 as a target gateway.

The equipment identity in the embodiment of the present invention may be an identity of equipment, where the identity of equipment may be identified by other equipment in the network, for example, an identity uniformly allocated by an operator during network deployment, such as a gateway identity, gateway 001 or a PLMN ID (public land mobile network identity)+gateway 001; may be a name, for example, a fully qualified domain name (FQDN, Fully Qualified Domain Name), where an address of a target core network element needs to be obtained through resolution or according to local configuration; may also be a specific prefix and identity that are added after an APN, for example, when the encoding format of the APN is APN.nri-gw<GW Number>.APNOI or APN.APNOI.gw<GW number>, APN is an access point name that is requested by the terminal, and nri-gw<GW number> or gw<GW number> is a special encoding indication equipment identity, where nri-gw or gw is a prefix, <GW number> may be a unique serial number of equipment in a specified range, and APNOI refers to an identity of an operator. The prefix and the identity may be placed at different positions of the APN or may exist in different spelling of letters, which is not limited here.

Here it should be noted that, in different access networks, the target core network element may have different titles, for example, in a UMTS, the core network element 1 is called GGSN; in an LTE/SAE, the core network element 1 is called PGW; and in a non-3GPP, the core network element 1 is called PGW, but the core network elements may be actually deployed together, and are the same network element devices physically, and are generally called PGW in LTE/SAE.

In the following second embodiment to fifth embodiment, methods for a terminal to obtain an equipment identity of a core network element 1 are introduced, where the core network element 1 and an access network 1 belong to the same network.

Figure 3:
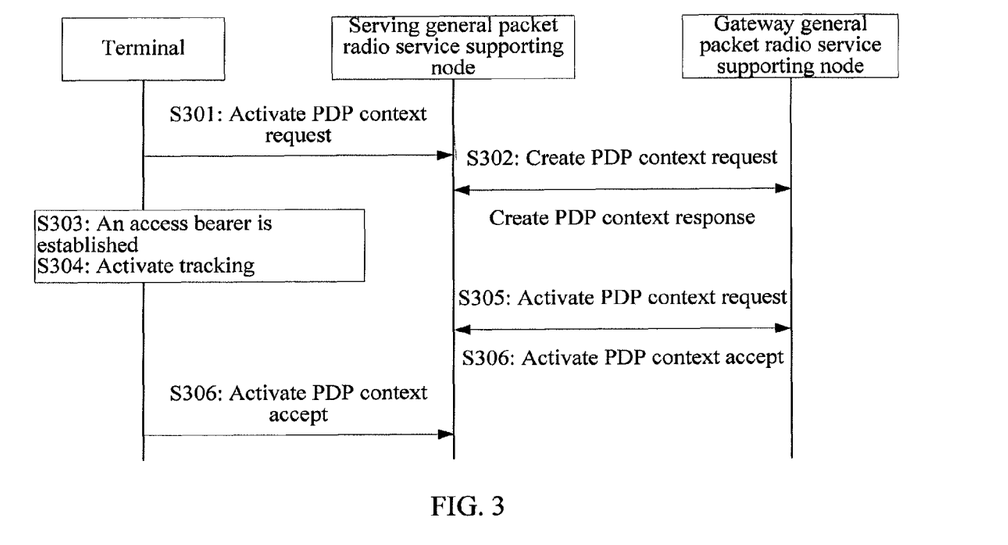
FIG. 3 is a schematic flowchart of a method according to a second embodiment of the present invention.

According to a second embodiment, an access network 1 is a UMTS access network, and reference may be made to FIG. 3 for a method for a terminal to obtain an equipment identity of a GGSN, where the method is specifically as follows:

S301: A terminal sends an activate PDP context request message to an SGSN.

S302: The SGSN sends a create PDP context request to a GGSN, and the GGSN carries a protocol optional configuration information element in a create PDP context response message, where the protocol optional configuration information element includes an equipment identity of the GGSN.

S303: A radio access bearer is established.

S304: Activate tracking.

S305: The SGSN optionally sends an update PDP context request message to the GGSN, the GGSN sends an update PDP context response, and the SGSN sends an activate PDP context accept message to the terminal, where the message carries the protocol optional configuration information element, and the protocol optional configuration information element includes the equipment identity of the GGSN.

Through this step, the GGSN may update the equipment identity carried in the create PDP context response message, and may also keep the equipment identity carried in the create PDP context response message unchanged.

S306: The SGSN sends an activate context accept message to the terminal, where the message carries the protocol optional configuration information element, and the protocol optional configuration information element includes the equipment identity of the GGSN.

In this embodiment, when completing accessing the UMTS belonging to the 3GPP, the terminal obtains the equipment identity of the GGSN.

Figure 4:
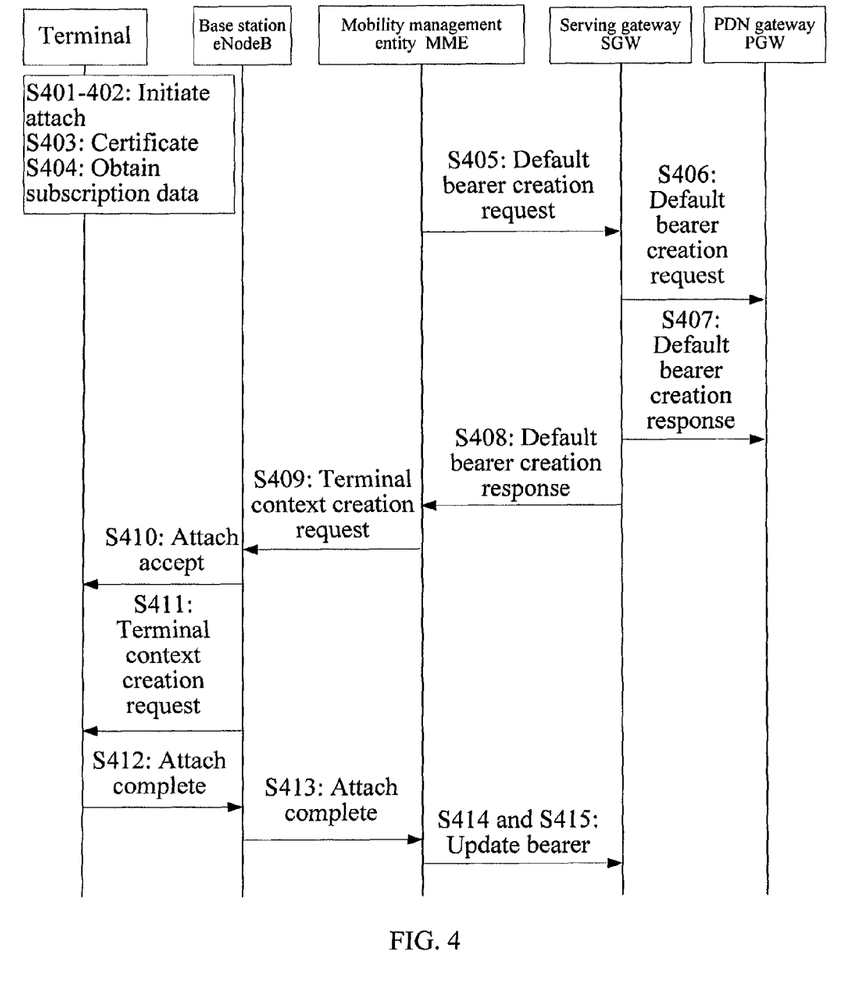
FIG. 4 is a schematic flowchart of a method according to a third embodiment of the present invention.

According to a third embodiment, an access network 1 is an LTE/SAE, and reference may be made to FIG. 4 for a method for a terminal to obtain an equipment identity of a PGW, where the method is specifically as follows:

S401-S402: A terminal initiates an attach request.

S403: A network initiates a certification process to a user.

S404: An MME initiates a position update process to an HSS, and obtains user subscription data.

S405: The MME initiates a default bearer creation request to an SGW.

S406: The SGW sends the default bearer creation request to a PGW.

S407: The PGW sends a create default bearer response message to the SGW, where the create default bearer response message carries a protocol optional configuration information element, and the protocol optional configuration information element includes an equipment identity of the PGW.

S408: The SGW sends a create default bearer response to the MME, where the create default bearer response carries the protocol optional configuration information element, and the protocol optional configuration information element includes the equipment identity of the PGW.

S409: The MME sends a terminal context creation request to an eNodeB, where the terminal context creation request carries an attach accept message, the attach accept message includes the default bearer creation request, the default bearer creation request carries the received protocol optional configuration information element, and the protocol optional configuration information element includes the equipment identity of the PGW; or an APN in the default bearer creation request carries the equipment identity of the PGW.

S410: The eNodeB sends the attach accept message to the terminal.

In this way, the terminal obtains the equipment identity of the PGW through the attach accept message.

S411: The eNodeB sends a context creation response to the terminal.

S412: The terminal sends an attach complete to the eNodeB.

S413: The eNodeB sends the attach complete to the MME.

S414-S415: The MME updates the bearer to the SGW.

In this embodiment, when completing accessing the LTE/SAE belonging to the 3GPP, the terminal obtains the equipment identity of the PGW.

Figure 5:
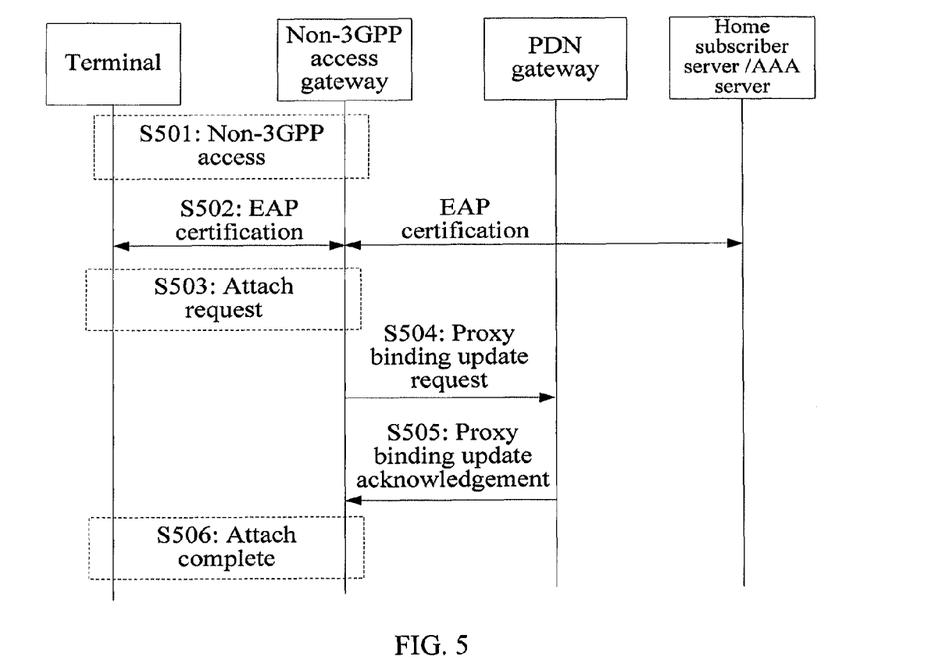
FIG. 5 is a schematic flowchart of a method according to a fourth embodiment of the present invention.

According to a fourth embodiment, an access network 1 is a non-3GPP system, and a non-3GPP access network gateway sends an equipment identity of a PGW to a terminal. Referring to FIG. 5, the method is specifically as follows:

S501: A terminal obtains a local IP address at a non-3GPP access network gateway.

S502: The terminal completes certification and authentication through an EAP protocol.

S503: The terminal initiates an attach request.

S504: The non-3GPP access network gateway selects a PGW and sends a proxy binding update to the POW.

S505: The PGW sends a proxy binding acknowledgement message to the non-3GPP access network gateway, and obtains an address of the terminal.

S506: The non-3GPP access network gateway sends an attach complete message to the terminal, where the attach complete message carries a protocol optional configuration information element, and the protocol optional configuration information element includes the equipment identity of the PGW.

S504 may occur before S502, that is, the non-3GPP access network gateway may first send the proxy binding update to the PGW, and then perform certification and authentication. The sequence of the foregoing steps is not limited here. If the certification or authentication fails, the non-3GPP access network gateway needs to send a proxy binding revocation to the PGW, and deletes the terminal context on the PGW.

In this embodiment, when completing accessing the non-3GPP, the terminal obtains the equipment identity of the PGW.

Figure 6:
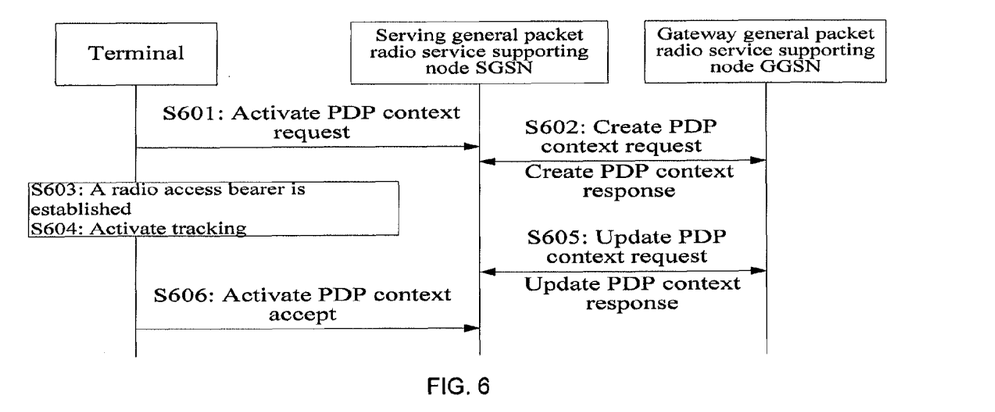
FIG. 6 is a schematic flowchart of a method according to a fifth embodiment of the present invention.

According to a fifth embodiment, an access network 1 is a UMTS, and reference may be made to FIG. 6 for a method for a terminal to obtain an equipment identity, where the method is specifically as follows:

S601: A terminal sends an activate PDP context request message to an SGSN.

S602: The SGSN selects a GGSN and sends a create PDP context request to the GGSN, the GGSN sends a create PDP context response message to the SGSN; an equipment identity of the GGSN may be selected by the SGSN through configuration of a local GGSN, and may also be obtained from a response message of a domain name system (DNS, Domain Name System).

S603: A radio access bearer is established.

S604: Activate tracking.

S605: The SGSN optionally sends an update PDP context request message to the GGSN, and the GGSN sends an update PDP context response.

S606: The SGSN sends an activate PDP context accept message, where the message carries an information element which indicates an equipment identity of the GGSN to the terminal.

Here, the equipment identity of the GGSN may be obtained by the SGSN through configuration of a local GGSN, and may also be obtained from a response message of a domain name system (DNS, Domain Name System); and the equipment identity of the GGSN is carried to the terminal through a protocol optional information element or an APN information element in the PDP context accept message.

In this embodiment, when completing accessing the UMTS belonging to the 3GPP, the terminal obtains the equipment identity of the GGSN.

After obtaining an equipment identity of a core network element 1, the terminal accesses an access network 2 that is heterogeneous to the access network 1, the core network element 2 selects a target network element according to the identity which is of the access network element 1 and obtained by the terminal, thus ensuring the continuity of the session. In the following fifth embodiment to tenth embodiment, several different access networks 2 are provided, and specific methods are as follows.

Figure 7:
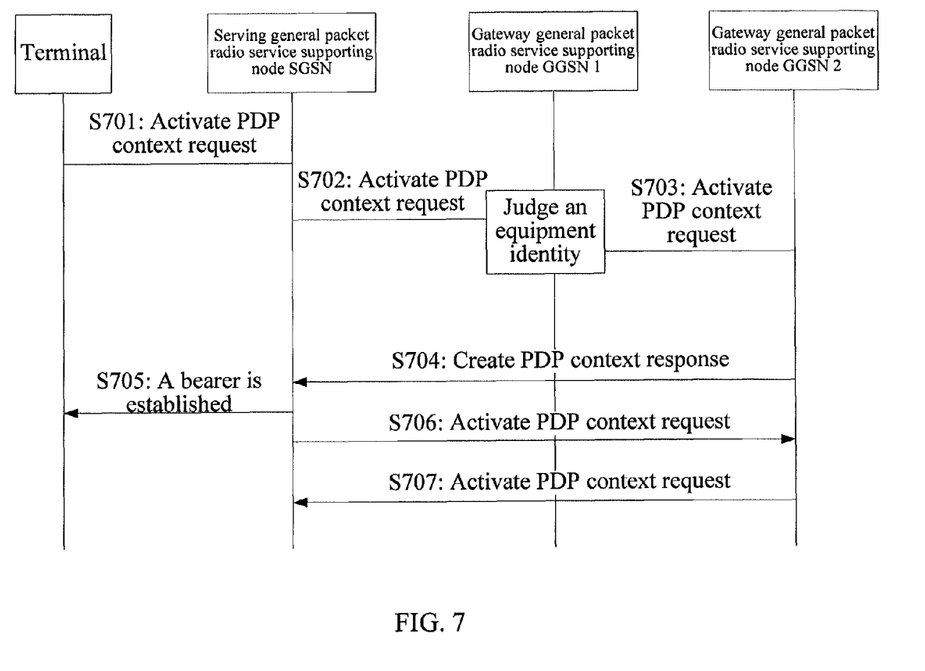
FIG. 7 is a schematic flowchart of a method according to a sixth embodiment of the present invention.

According to a sixth embodiment, an access network 2 is a UMTS network, and reference may be made to FIG. 7 for a method for selecting a target gateway, where the method is specifically as follows:

S701: A terminal sends an activate PDP context request message to an SGSN, where a protocol optional configuration information element carries an equipment identity, the equipment identity is an equipment identity which is of a core network element 1 and obtained by the terminal, and the core network element 1 and the access network 1 belong to a same network. Optionally, it should be noted that this is a handover, but not a new create bearer request.

S702: The SGSN sends a create PDP context request to a GGSN 1.

S703: The GGSN 1 resolves the equipment identity in the protocol optional configuration information element, and if the identity indicates the GGSN 1, executes the same processing as that in step S704, and sends a create PDP context response message to the SGSN.

If the equipment identity indicates another network element GGSN 2, the GGSN 1 may obtain an address of the GGSN 2 corresponding to the equipment identity, and forward the create PDP context request to the GGSN 2. In this way, the selection of a target network element is completed.

S704: The GGSN sends a create PDP context response message to the SGSN, and the GGSN optionally updates its equipment identity in a PCO, and indicates the updated equipment identity to the terminal.

If the equipment identity obtained by the GGSN 1 through resolution in S703 indicates the GGSN 1, the GGSN in this step is the GGSN 1.

If the equipment identity obtained by the GGSN 1 through resolution in S703 indicates the GGSN 2, the GGSN in this step is the GGSN 2.

Certainly, the present invention is not limited to two GGSNs. In the case that more than two GGSNs exist, the process manner is the same. The situation that the GGSN 1 judges the equipment identity is only taken as an example here, and certainly, other GGSNs may also be adopted to perform the judgment, for example, the GGSN 2 judges the equipment identity.

S705: A radio access bearer is established.

S706: The SGSN optionally sends an update PDP context request message to the GGSN, and the GGSN sends an update PDP context response.

S707: The SGSN sends an activate PDP context accept message, where the message caries an information element which indicates the identity of the GGSN to the terminal.

It should be noted that, the GGSN here may be only one. If only one GGSN exists, the GGSN naturally selects itself as the target network element to complete the session continuation. The judgment in S703 may be performed merely according to the equipment identity, and may also be performed by adopting the equipment identity in combination with the user identity. That is, first, judge whether the equipment identity indicates the GGSN itself, and then, judge whether a context of the user is on the GGSN according to the user identity.

In this embodiment, the access network 1 is a non-3GPP access network, through the foregoing steps, handover between heterogeneous networks is completed, no HSS needs to participate in the continuation, and moreover, the terminal does not need to support a MIP protocol stack.

Figure 8:
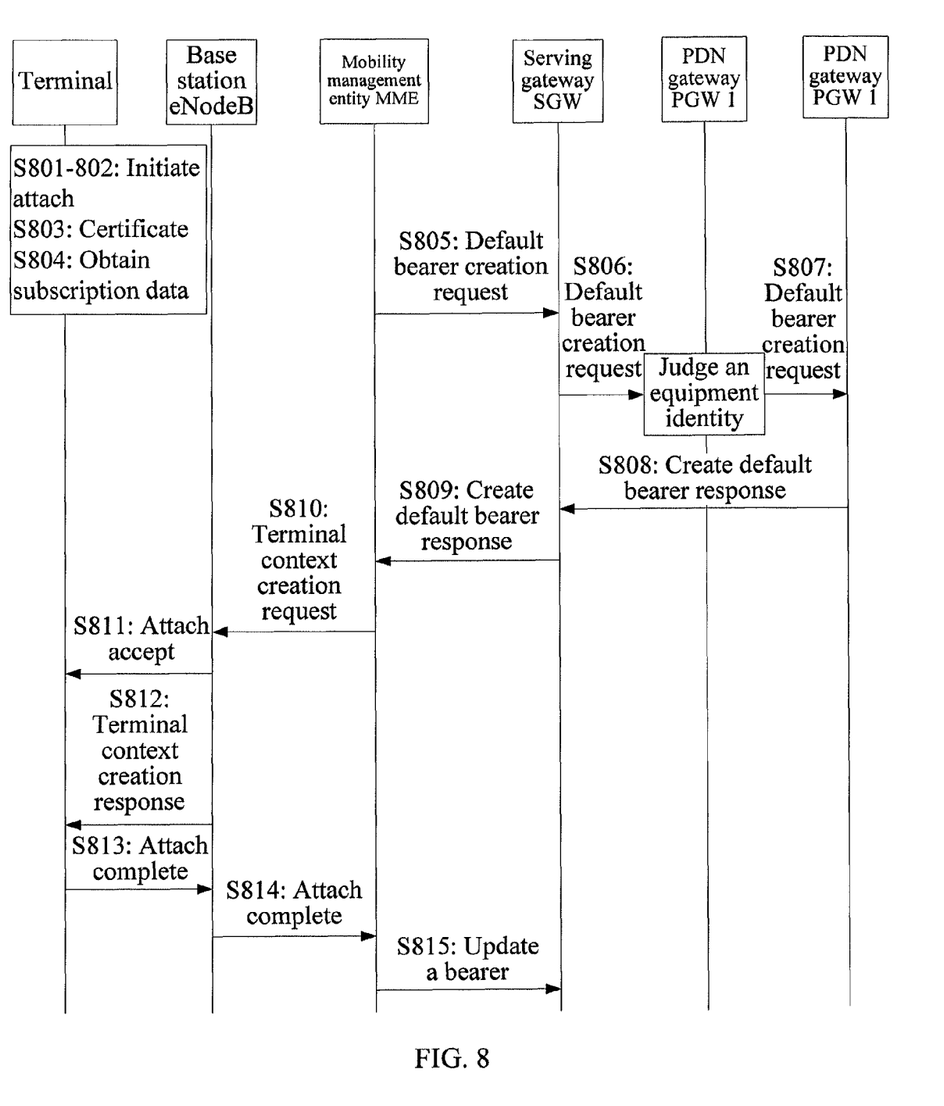
FIG. 8 is a schematic flowchart of a method according to a seventh embodiment of the present invention.

According to a seventh embodiment, an access network 2 is an LTE/SAE, and reference may be made to FIG. 8 for a method for selecting a target gateway, where the method is specifically as follows:

S801-S802: A terminal initiates an attach request.

A protocol optional configuration information element carries an equipment identity, the equipment identity is an equipment identity which is of a core network element 1 and obtained by the terminal, and the core network element 1 and an access network 1 belong to a same network. Optionally, it should be noted that this is a handover, but not a new create bearer request.

S803-S804: Perform network certification, and obtain subscription data.

S805: An MME initiates a default bearer creation request to an SGW.

S806: The SGW sends a default bearer creation request to a PGW 1.

S807: The PGW 1 resolves the equipment identity in the protocol optional configuration information element, if the identity indicates the PGW 1, executes the same processing as that in step S808, and sends a create default bearer response message to the SGW.

If the equipment identity indicates another network element PGW 2, the PGW 1 may obtain an address of the PGW 2 corresponding to the equipment identity, and forward the default bearer creation request to the PGW 2.

S808: The PGW sends a creation response message to the SGW, where the message carries a protocol optional configuration information element, and the protocol optional configuration information element includes an identity of the PGW.

If the equipment identity obtained by the PGW 1 through resolution in S807 indicates the PGW 1, the PGW in this step is the PGW 1.

If the equipment identity obtained by the PGW 1 through resolution in S807 indicates the PGW 2, the PGW in this step is the PGW 2.

S809: The SGW sends a create default bearer response to the MME, where the response carries the protocol optional configuration information element, and the protocol optional configuration information element includes the identity of the PGW.

S810: The MME sends a terminal context creation request to an eNodeB, where the request carries an attach accept message, the attach accept message includes the default bearer creation request, the default bearer creation request carries the protocol optional configuration information element, and the protocol optional configuration information element includes the equipment identity of the PGW.

S811: Radio resource connection is established, and the eNodeB delivers the attach accept message to the terminal.

S812: The eNodeB sends a terminal context creation response.

S813: The terminal sends an attach complete to the eNodeB.

S814: The eNodeB sends the attach complete to the MME.

S815: The MME updates the bearer to the SOW.

The access network 1 in this embodiment is a non-3GPP access network, and through the foregoing steps, continuation of calls between heterogeneous networks is completed.

The access network 1 in this embodiment is a non-3GPP access network, through the foregoing steps, handover between heterogeneous networks is completed, no HSS needs to participate in the continuation, and moreover, the terminal does not need to support a MIP protocol stack.

Figure 9:
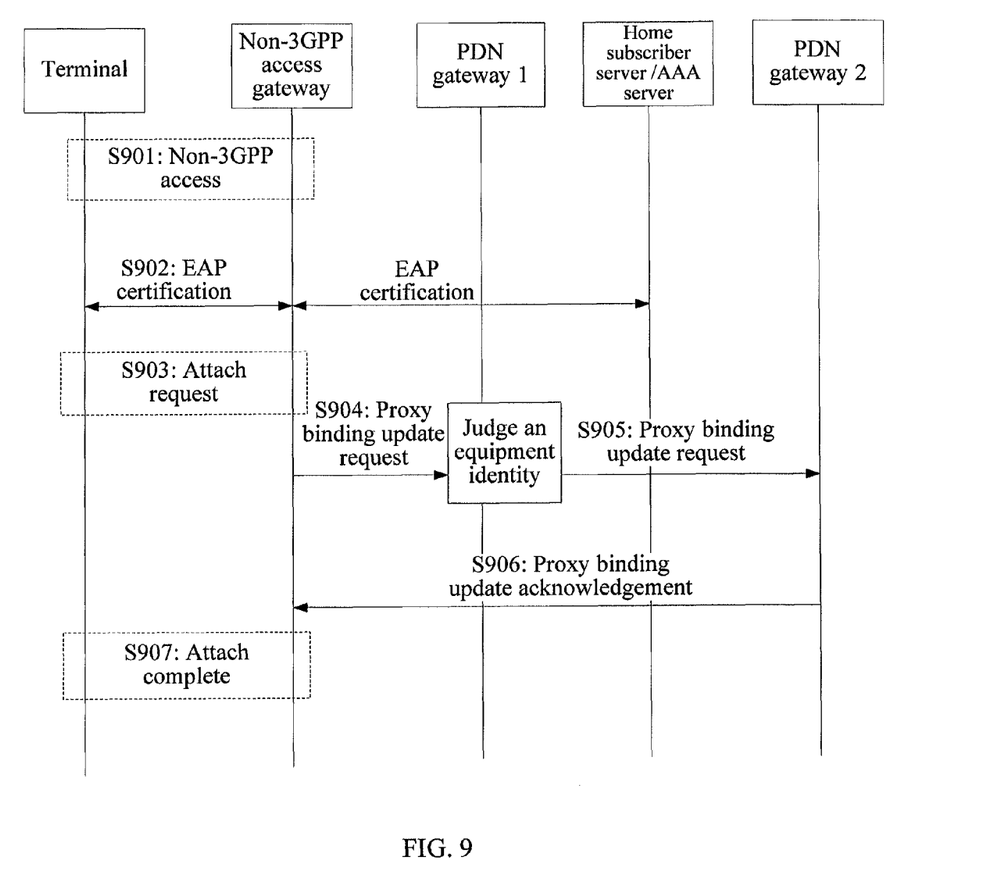
FIG. 9 is a schematic flowchart of a method according to an eighth embodiment of the present invention.

According to an eighth embodiment, an access network 2 is a non-3GPP access network, and reference may be made to FIG. 9 for a method for selecting a target gateway, where the method is as follows:

S901: A terminal obtains a local IP address at a non-3GPP access network gateway.

S902: The terminal completes certification and authentication through an EAP protocol.

S903: The terminal initiates an attach process, where a protocol optional configuration information element carries an equipment identity of a core network element 1. Optionally, it should be noted that this is a handover, but not a new create bearer request.

S904: The non-3GPP access network gateway sends a proxy binding update to a PGW 1, where the proxy binding update carries a protocol optional configuration information element.

The equipment identity of the core network element 1 is carried in the protocol optional configuration information element and is sent to the PGW 1.

S905: The PGW 1 resolves the equipment identity in the protocol optional configuration information element, and selects the POW.

If the equipment identity indicates the PGW 1, the PGW 1 executes the same processing as that in S906, and sends a proxy binding response message to the non-3GPP access network gateway.

If the equipment identity obtained by the PGW 1 through resolution in S905 indicates the PGW 1, the PGW in this step is the PGW 1.

If the equipment identity obtained by the PGW 1 through resolution in S905 indicates the PGW 2, the PGW in this step is the PGW 2.

S906: The PGW sends a proxy binding acknowledgement message to the non-3GPP access network gateway, and obtains an address of the terminal.

S907: The non-3GPP access network gateway sends an attach complete message to the terminal, where the message carries the protocol optional configuration information element, and the protocol optional configuration information element includes an identity of the PGW.

The access network 1 in this embodiment is a 3GPP access network, for example, a UMTS and an LTE/SAE. Through the foregoing steps, continuation of calls between heterogeneous networks is completed.

It should be noted that, S904 may occur before S902, that is, the non-3GPP access network gateway may first sends the binding update to the PGW, and then, performs certification and authentication. Here, the sequence of the foregoing steps is not limited.

The access network 1 in this embodiment is a 3GPP access network, for example, a UMTS and an LTE/SAE. Through the foregoing steps, continuation of calls between heterogeneous networks is completed, no HSS needs to participate in the continuation, and moreover, the terminal does not need to support a MIP protocol stack.

Figure 10:
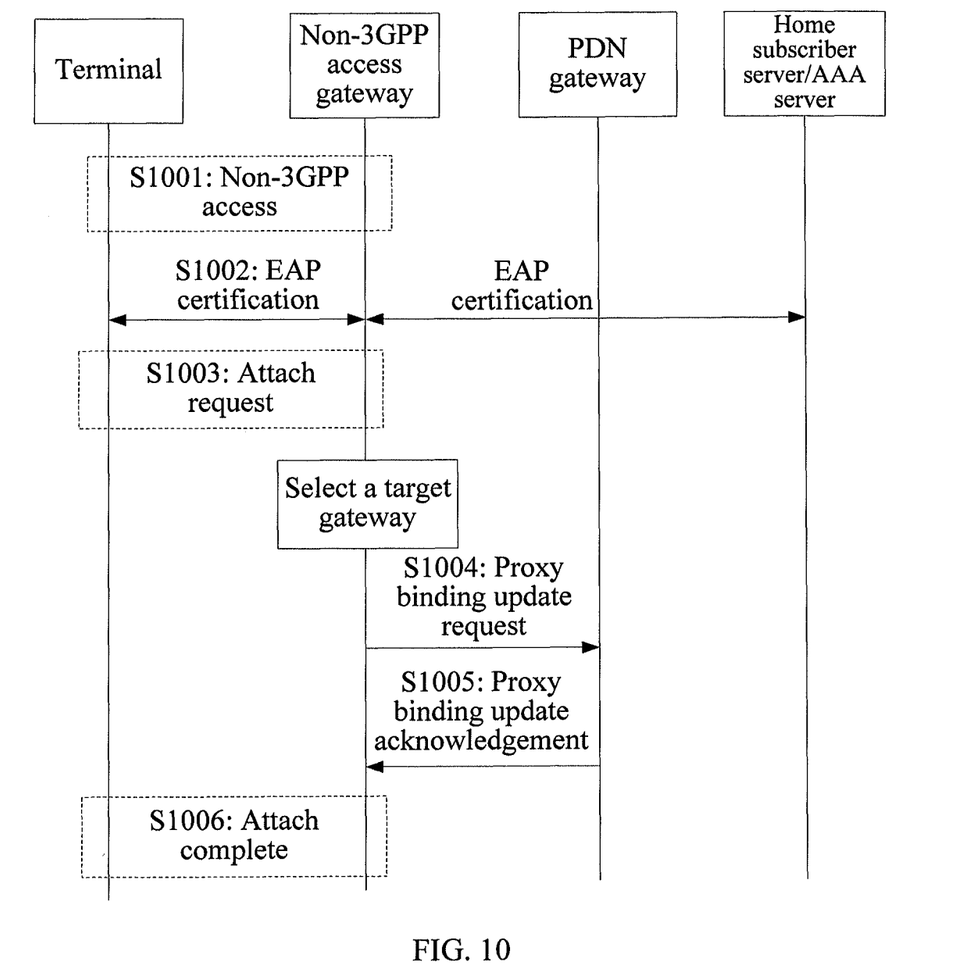
FIG. 10 is a schematic flowchart of a method according to a ninth embodiment of the present invention.

According to a ninth embodiment, an access network 2 is a non-3GPP access network, and reference may be made to FIG. 10 for a method for selecting a target gateway, where the method is as follows:

S1001: A terminal obtains a local IP address at a non-3GPP access network gateway.

S1002: The terminal completes certification and authentication through an EAP protocol.

S1003: The terminal initiates an attach process, where a request message carries an equipment identity of a core network element 1, and the core network element 1 and the access network 1 belong to a same network. Optionally, it should be noted that this is a handover, but not a new create bearer request.

S1004: The non-3GPP access network gateway obtains a PGW address through resolution according to the received equipment identity, selects a target gateway PGW, and sends a proxy binding update to the PGW. Optionally, the message indicates that this is a handover.

S1005: The PGW sends a proxy binding acknowledgement message to the non-3GPP access network gateway.

S1006: The non-3GPP access network gateway sends an attach complete message to the terminal, the message optionally carries a protocol optional configuration information element, and the protocol optional configuration information element includes an identity of the PGW.

An access network 1 in this embodiment is a 3GPP access network, for example, a UMTS and an LTE/SAE. Through the foregoing steps, continuation of calls between heterogeneous networks is completed, no HSS needs to participate in the continuation, and moreover, the terminal does not need to support a MIP protocol stack.

Figure 11:
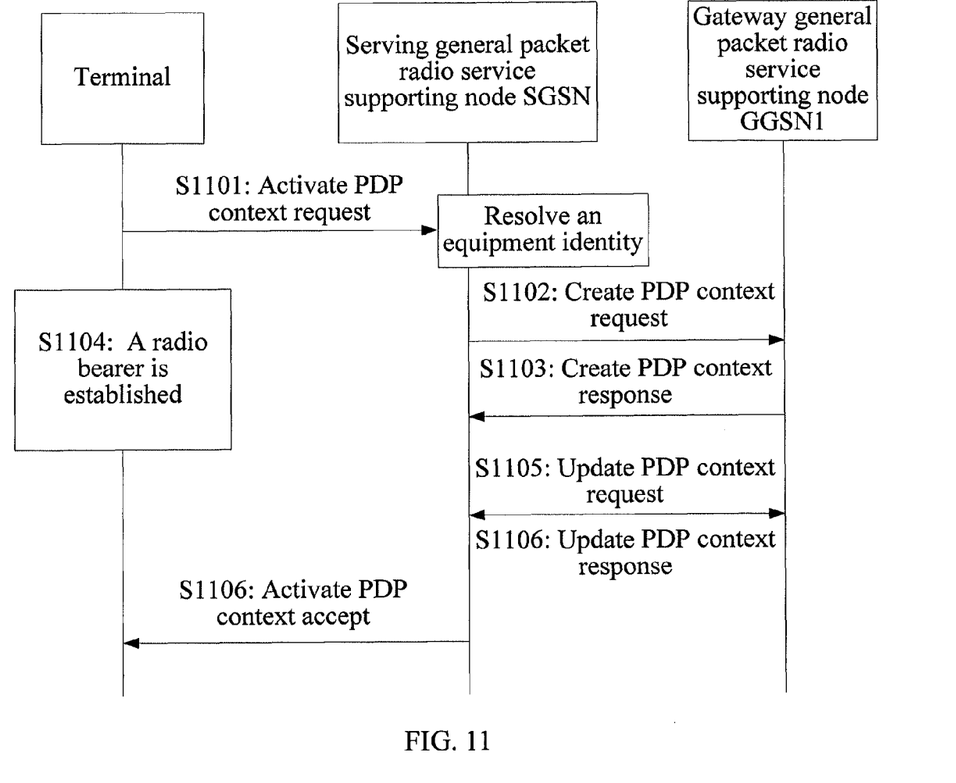
FIG. 11 is a schematic flowchart of a method according to a tenth embodiment of the present invention.

Referring to FIG. 11 for a tenth embodiment.

S1101: A terminal sends an activate PDP context request message to an SGSN, where the message carries an equipment identity of a core network element 1, for example, an equipment identity may be carried in an APN. Optionally, it should be noted in a protocol optional configuration information element that this is a handover, but not a new create bearer request.

S1102: The SGSN resolves a gateway address according to the equipment identity carried in the APN, and sends a create PDP context request to a GGSN 1 according to the resolved gateway address, and the request optionally carries a handover indication.

It should be noted that, a specific resolution method may be extracting the equipment identity in the APN, and querying local configuration, so as to obtain the gateway address; and may also be sending a resolution request for the APN which carries the equipment identity to a domain name system, so as to obtain the gateway address, the specific resolution method is not limited here.

S1103: The GGSN 1 hands over a tunnel to the SGSN (or perform tunnel handover when sending an update PDP context request), and sends a create PDP context response (Create PDP Context Response) message to the SGSN.

S1104: A radio access bearer is established.

S1105: The SGSN optionally sends an update PDP context request message to the GGSN 1, and the GGSN 1 sends an update PDP context response. The GGSN 1 may optionally indicate its identity to the terminal in this process.

S1106: The SGSN sends an activate PDP context accept (Activate PDP Context Accept) message, where the message carries an information element which indicates an identity of a GGSN to the terminal.

The processing of an MME is similar, and the details are not repeatedly described here.

It should be noted that, the foregoing second embodiment to fifth embodiment and sixth embodiment to tenth embodiment respectively represent two steps for selecting a gateway during handover, so the method for selecting a gateway during handover may have multiple combinations of embodiments as long as the networks that are accessed are heterogeneous networks.

Additionally, in order to keep the unity of the process, like accessing the access network 2, the terminal may also carry the equipment identity of the core network element at the access network 1, but the equipment identity of the core network element may be an invalid identity; in this way, the core network element 2 may select a core network element (PGW/GGSN) randomly or according to a policy of the core network element 2; and the equipment identity of the core network element may also be an equipment identity of a core network element that ends a session, so the core network element 2 may select a core network element that is the same as the core network element that ends the session.

If the terminal has multiple sessions simultaneously, when accessing the access network 2, the terminal may send a session connection request one by one, where the requests carry the equipment identity obtained in the access network 1, so that the core network element 2 selects the core network element 1, thus maintaining the continuity of the multiple sessions. The basic principle is the same, and details are not repeatedly described here.

Figure 12:
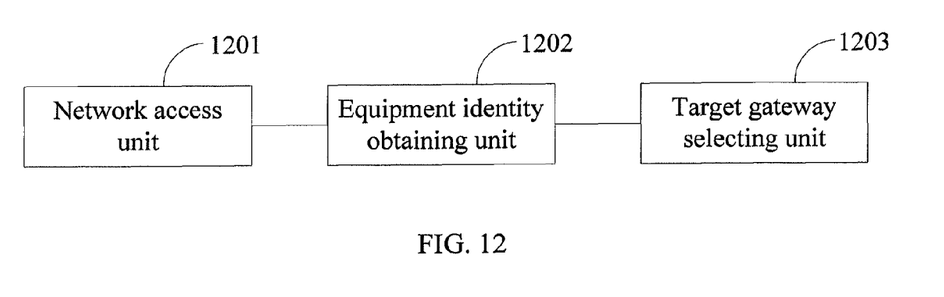
FIG. 12 is a schematic structural diagram of a terminal according to an eleventh embodiment of the present invention.

Corresponding to the foregoing methods, an eleventh embodiment of the present invention provides a terminal. As shown in FIG. 12, the terminal includes:

a network access unit 1201, configured to access an access network 1 and an access network 2 in sequence;

an equipment identity obtaining unit 1202, configured to obtain an equipment identity of a core network element 1; and an equipment identity sending unit 1203, configured to send the equipment identity which is of the core network element 1 and obtained by the equipment identity obtaining unit 1202 to a core network element 2.

Here, the equipment identity obtaining unit 1202 is configured to obtain an equipment identity in a protocol optional configuration information element or in an APN, where the protocol optional configuration information element or the APN is carried in a default bearer creation request in an attach accept message or carried in an activate PDP context accept message. If the access network 1 is a non-3GPP access network, the terminal obtains an equipment identity in an optional configuration information element which is in an attach complete message. Here, the access network 1 and the access network 2 are heterogeneous networks, for example, the access network 1 is a 3GPP access network, and the access network 2 is a non-3GPP access network, and vice versa.

The terminal provided by the twelfth embodiment of the present invention may not need to support a complex MIP protocol stack during handover between heterogeneous networks.

Figure 13:
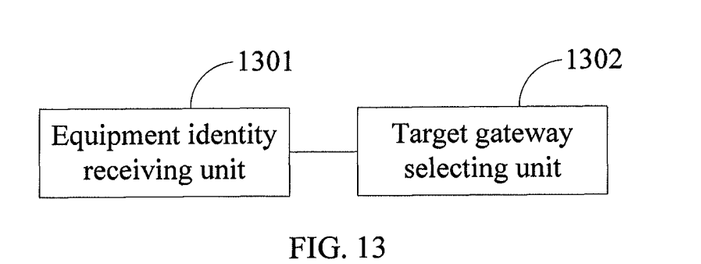
FIG. 13 is a schematic structural diagram of a core network element according to a twelfth embodiment of the present invention.

An embodiment of the present invention further provides a core network element, as shown in FIG. 13, where the core network element includes:

an equipment identity receiving unit 1301, configured to receive an equipment identity which is of another core network element and sent by a terminal; and a target gateway selecting unit 1302, configured to, according to the equipment identity which is of the core network element and received by the equipment identity receiving unit 1201, select a target gateway; and if the received equipment identity is different from the equipment identity of the core network element itself, select a core network element corresponding to the received equipment identity as a target gateway.

Here, for the method for the target gateway selecting unit 1302 to select a target network element, reference may be made to the fifth embodiment to the tenth embodiment.

The target gateway selecting unit 1302 is configured to judge whether the equipment identity which is in the optional configuration information element and obtained through resolution is the same as the equipment identity of the core network element itself, and if the equipment identity which is in the optional configuration information element and obtained through resolution is the same as the equipment identity of the core network element itself, select the core network element itself as the target gateway; and if the equipment identity which is in the optional configuration information element and obtained through resolution is different from the equipment identity of the core network element itself, select a core network element corresponding to the received equipment identity as the target gateway; or through local configuration or DNS resolution, obtain an equipment identity of a core network element, and select the core network element as the target gateway.

The core network element provided by the embodiments of the present invention may be a PGW or a GGSN; may also be equipment in which a PGW and a GGSN are deployed together, and for the convenience, generally called a PGW. The PGW may support functions of a GGSN to complete UMTS access.

Figure 14:
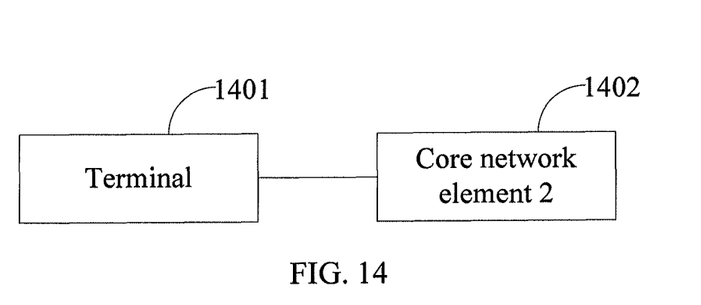
FIG. 14 is a schematic structural diagram of a communication system according to a thirteenth embodiment of the present invention.

A thirteenth embodiment of the present invention provides a communication system, as shown in FIG. 14, where the communication system includes:

an access network 1 and an access network 2 that is heterogeneous to the access network 1, and a core network element 1 that belongs to a same network as a core network 1, and further includes:

a terminal 1401, configured to access the access network 1, obtain an equipment identity of the core network element 1; access the access network 2, send the obtained equipment identity of the core network element 1 to a core network element 2; and the core network element 2 1402, configured to receive the equipment identity which is of the core network element 1 and sent by the terminal, according to the received equipment identity of the core network element, select a target gateway; and if an equipment identity of the core network element 2 is different from the equipment identity of the core network element 1, select the core network element 1 as a target gateway.

Here, the access network 1 and the access network 2 are heterogeneous networks, for example, the access network 1 is a 3GPP access network, and the access network 2 is a non-3GPP access network, and vice versa. Through the communication system provided by the embodiment of the present invention, the session continuity is maintained when the terminal is handed over between heterogeneous networks, and moreover, the number of network elements that participate in handover is less, and the terminal does not need to support a MIP protocol stack.

Described above are exemplary embodiments of the present invention. It should be noted that: Persons of ordinary skill in the art may further make modifications and variations without departing from the principle of the present invention, and these modifications and variation shall fall within the scope of the present invention.

What is claimed is:

1. A gateway selection method during heterogeneous network handover, comprising:
    accessing, by a terminal, a first access network;
    obtaining, by the terminal, an equipment identity of a first core network element;
    accessing, by the terminal, a second access network, wherein the second access network and the first access network are heterogeneous networks;
    sending, by the terminal, the obtained equipment identity of the first core network element to a second core network element, such that when an equipment identity of the second core network element is different from the equipment identity of the first core network element, the second core network element selects the first core network element as a target gateway in order that the terminal is handed over to the target gateway to maintain session continuity in first access network; wherein the equipment identity of the first core network element comprises:
    a gateway identity uniformly allocated by an operator during network deployment; or
    a fully qualified domain name (FQDN); or
    a prefix and an identity that are added in an APN.

2. The method according to claim 1, wherein
    the first access network is a universal mobile telecommunications system (UMTS) access network, the first core network element comprises is a gateway general packet radio service support node (GGSN), and the second access network comprises a non-3GPP access network; or
    the first access network comprises a long term evolution (LTE) access network or a system architecture evolution (SAE) access network, the first core network element comprises a PGW, and the second access network comprises a non-3GPP access network; or
    the first access network comprises a non-3GPP access network, the first core network element comprises a PDN gateway (PGW), and the second access network comprises is a 3GPP access network.

3. The method according to claim 2, wherein the obtaining, by the terminal, the equipment identity of the first core network element comprises:
    obtaining, by the terminal, an equipment identity in a protocol optional configuration information element, wherein the protocol optional configuration information element is carried in an activate PDP context accept message or in a default bearer creation request which is in an attach accept message of 3GPP access; or
    obtaining, by the terminal, an equipment identity in a protocol optional configuration information element carried in an attach complete message of non-3GPP access; or
    obtaining, by the terminal, an equipment identity in an access point name (APN) carried in an activate PDP context accept message or in a default bearer creation request which is in an attach accept message.

4. The method according to claim 3, wherein the selecting the first core network element as the target gateway comprises:
    obtaining, by the second core network element, an address of the first core network element according to location configuration or DNS domain name resolution, and selecting the first core network element as the target gateway.

5. The method according to claim 1, wherein
if the equipment identity of the second core network element is the same as the equipment identity of the first core network element, the second core network element is the first core network element, and is the selected target gateway.

6. A terminal, comprising:
a network access unit, configured to access a first access network and a second access network in sequence, wherein the first access network and the second access network are heterogeneous networks;
an equipment identity obtaining unit, configured to obtain an equipment identity of a first core network element; and
an equipment identity sending unit, configured to send the equipment identity which is of the first core network element and obtained by the equipment identity obtaining unit, to the second core network element, wherein if it is determined that the equipment identity of the first core network element is different from an equipment identity of the second core network element, the second core network element selects the first core network element as a target gateway in order that the terminal is handed over to the target gateway to maintain session continuity in the first access network; wherein the equipment identity of the first core network element comprises:
a gateway identity uniformly allocated by an operator during network deployment or
a fully qualified domain name (FQDN); or
a prefix and an identity that are added in an APN.

7. The terminal according to claim 6, wherein the equipment identity obtaining unit is configured to obtain an equipment identity in a protocol optional configuration information element or in an access point name (APN), wherein the protocol optional configuration information element or the APN is carried in an activate PDP context or in a default bearer activation request which is in an attach accept message.

8. A core network element, comprising:
an equipment identity receiving unit, configured to:
receive an equipment identity which is of another core network element and sent by a terminal; and
a target gateway selecting unit, configured to, according to the equipment identity which is of the core network element and received by the equipment identity receiving unit, select a target gateway; and
if the received equipment identity is different from an equipment identity of the core network element itself, the core network element selects another core network element corresponding to the received equipment identity as a target gateway in order that the terminal is handed over to the target gateway to maintain session continuity in target gateway's access network; wherein the equipment identity of the first core network element comprises:
a gateway identity uniformly allocated by an operator during network deployment; or
a fully qualified domain name (FQDN); or
a prefix and an identity that are added in an APN.

9. The core network element according to claim 8, wherein the target gateway selecting unit is configured to judge whether an equipment identity which is in an optional configuration information element and obtained through resolution or an equipment identity which is in an APN and obtained through resolution is the same as an equipment identity of the core network element itself, and if the equipment identity which is in the optional configuration information element and obtained through resolution or the equipment identity which is in the APN and obtained through resolution is the same as an equipment identity of the core network element itself, select the core network element itself as a target gateway; and if the equipment identity which is in the optional configuration information element and obtained through resolution or the equipment identity which is in the APN and obtained through resolution is different from an equipment identity of the core network element itself, select a core network element corresponding to the received equipment identity of another core network element as a target gateway.

10. The core network element according to claim 8, wherein the target gateway selecting unit is configured to obtain an equipment identity of the core network element through local configuration or DNS resolution, and select the core network element as a target gateway.

11. The core network element according to claim 9, wherein the core network element is a PGW or a GGSN.

* * * * *